(12) United States Patent
Brew et al.

(10) Patent No.: US 10,803,203 B2
(45) Date of Patent: Oct. 13, 2020

(54) SELF-CONFIGURING EXPERTISE VERIFICATION

(71) Applicant: International Business Machines Corporation, Armonk, NY (US)

(72) Inventors: Kevin W. Brew, Ronkonkoma, NY (US); Michael Gordon, Yorktown Heights, NY (US); James Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 15/673,922

(22) Filed: Aug. 10, 2017

(65) Prior Publication Data
US 2019/0050588 A1 Feb. 14, 2019

(51) Int. Cl.
*G06F 21/62* (2013.01)
*G06N 20/00* (2019.01)
*G06F 21/60* (2013.01)
*G06F 40/30* (2020.01)
*G06F 40/40* (2020.01)
*G06F 40/258* (2020.01)

(52) U.S. Cl.
CPC .......... *G06F 21/629* (2013.01); *G06F 21/604* (2013.01); *G06F 40/258* (2020.01); *G06F 40/30* (2020.01); *G06F 40/40* (2020.01); *G06N 20/00* (2019.01); *G06F 2221/2133* (2013.01)

(58) Field of Classification Search
CPC .. G06F 21/629; G06F 21/604; G06F 17/2745; G06F 17/2785; G06F 17/28; G06F 2221/2133; G06N 20/00
See application file for complete search history.

(56) References Cited

U.S. PATENT DOCUMENTS

| | | | |
|---|---|---|---|
| 7,680,891 B1 * | 3/2010 | Pongsajapan | G06Q 10/107 709/206 |
| 7,841,940 B2 | 11/2010 | Bronstein | |
| 8,494,854 B2 | 7/2013 | Gross | |
| 8,978,121 B2 | 3/2015 | Shuster | |
| 9,009,846 B2 | 4/2015 | Kishi et al. | |

(Continued)

OTHER PUBLICATIONS https://security.googleblog.com/2013/10/recaptcha-just-got-easier-but-only-if.html, published Oct. 25, 2013, accessed Dec. 9, 2016.

(Continued)

*Primary Examiner* — Matthew Smithers
*Assistant Examiner* — Mirza Israr Javed
(74) *Attorney, Agent, or Firm* — Cantor Colburn LLP; Anthony Curro (57) ABSTRACT

A computer-implemented method includes detecting initiation of submission of content on a forum. Using a computer processor, an expertise associated with the content is determined. Using the computer processor, challenge data is determined based at least in part on the expertise. Using the computer processor, expected response data corresponding to the challenge data is determined. The challenge data is presented. An entered response is received in reply to the challenge data. The content is allowed to be posted on the forum based at least in part on comparing the entered response data to the expected response data.

17 Claims, 4 Drawing Sheets

(56) References Cited

U.S. PATENT DOCUMENTS

| | | | |
|---|---|---|---|
| 9,105,034 B2 | 8/2015 | Hamilton, II et al. | |
| 9,147,065 B2 * | 9/2015 | Lauer | G06F 21/36 |
| 2011/0231780 A1 * | 9/2011 | Ayloo | G06Q 10/10 |
| | | | 715/753 |
| 2015/0126286 A1 * | 5/2015 | Guo | A63F 13/55 |
| | | | 463/42 |
| 2015/0379120 A1 * | 12/2015 | Allen | G06F 16/3344 |
| | | | 707/723 |
| 2016/0012744 A1 * | 1/2016 | Rogers | G09B 7/07 |
| | | | 434/350 |
| 2017/0277755 A1 * | 9/2017 | Bahl | G06F 16/24573 |
| 2019/0050588 A1 * | 2/2019 | Brew | G06F 40/30 |

OTHER PUBLICATIONS https://security.googleblog.com/2014/12/are-you-robot-introducing-no-captcha.html, published Dec. 3, 2014, accessed Dec. 9, 2016.
Sivakorn et al., "I'm not a human: Breaking the Google reCAPTCHA", Black Hat Asia 2016, Mar. 29, 2016 to Apr. 1, 2016, accessed Dec. 9, 2016.

* cited by examiner

SELF-CONFIGURING EXPERTISE VERIFICATION

BACKGROUND

The present invention generally relates to user authentication and, more specifically, to self-configuring expertise verification.

While the internet can be a useful source of information, it can be difficult to distinguish between accurate and inaccurate information posted on websites, such as on forums or social networking websites. Anonymity enables users to claim expertise that they might not necessarily have, and users may mistakenly give too high a value to content posted by others who do not have the expertise claimed.

A Completely Automated Public Turing test to tell Computers and Humans Apart (CAPTCHA) is useful for distinguishing a human from a bot over the web, thus addressing some concerns with respect to anonymity. A traditional CAPTCHA is a challenge-and-response test used in computing, such as on the web, to determine whether a user is human. The general concept behind CAPTCHAs is that humans can quickly extract information from audio or photographic images, and can type that information for verification. For instance, a CAPTCHA may include an image of distorted characters, such as a combination of letters and numbers, where the user is asked to type the characters in a text box. A computing device then compares the typed text to a known value of the distorted characters, and if it is deemed that the user typed the characters correctly, then the user is verified as human.

SUMMARY

According to an embodiment of this invention, a computer-implemented method includes detecting initiation of submission of content on a forum. Using a computer processor, an expertise associated with the content is determined. Using the computer processor, challenge data is determined based at least in part on the expertise. Using the computer processor, expected response data corresponding to the challenge data is determined. The challenge data is presented. An entered response is received in reply to the challenge data. The content is allowed to be posted on the forum based at least in part on comparing the entered response data to the expected response data.

In another embodiment, a system includes a memory having computer-readable instructions and one or more processors for executing the computer-readable instructions. The computer-readable instructions include detecting initiation of submission of content on a forum. Further according to the computer-readable instructions, an expertise associated with the content is determined. Challenge data is determined based at least in part on the expertise. Expected response data corresponding to the challenge data is determined. The challenge data is presented. An entered response is received in reply to the challenge data. The content is allowed to be posted on the forum based at least in part on comparing the entered response data to the expected response data.

In yet another embodiment, a computer-program product for verifying an expertise includes a computer-readable storage medium having program instructions embodied therewith. The program instructions are executable by a processor to cause the processor to perform a method. The method includes detecting initiation of submission of content on a forum. Further according to the method, an expertise associated with the content is determined. Challenge data is determined based at least in part on the expertise. Expected response data corresponding to the challenge data is determined. The challenge data is presented. An entered response is received in reply to the challenge data. The content is allowed to be posted on the forum based at least in part on comparing the entered response data to the expected response data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

A problem with web-based forums is that readers of posted content, such as comments or new posts, are unable to identify the accuracy of such content or know the authenticity of the authors. While CAPTCHA conventionally provides a mechanism for confirming that a user is human, this mechanism is unable to authenticate a user's expertise. As such, a user might prove that he or she is human by way of CAPTCHA, but any claimed expertise remains unproven.

Turning now to an overview of the aspects of the invention, one or more embodiments of the invention address the above-described shortcomings of the prior art by providing a mechanism to automatically verify a poster's expertise. A verification system according to some embodiments of the invention automatically presents challenge data to a poster. According to some embodiments of the verification system, the challenge data is selected based at least in part on the poster's claimed or implied expertise. For example, and not by way of limitation, the verification system may use natural language processing to determine a poster's claimed expertise from data provided by the poster, and may determine from available data sources challenge data associated with the expertise, where that challenge data is useable for verifying that expertise. The challenge data may be presented to the poster, and the poster may be prompted to enter response data in reply to the challenge data. The response data may be analyzed, such as by way of natural language processing performed by a computer processor, to determine whether the response data matches expected response data. If the response data and the expected response data are deemed to match, the verification system may allow content of the poster to be posted, and may mark the poster's content as being associated with a verified level of expertise. Generally, as a technical improvement over standard CAPTCHA systems, some embodiments of the verification system trigger appropriate expertise challenges based at least in part on input received from users. A triggered expertise challenge may be determined automatically by feedback from machine learning that monitors user-submitted content and detects any claims of specific expertise, including field of expertise, level of expertise, or both.

Figure 1:
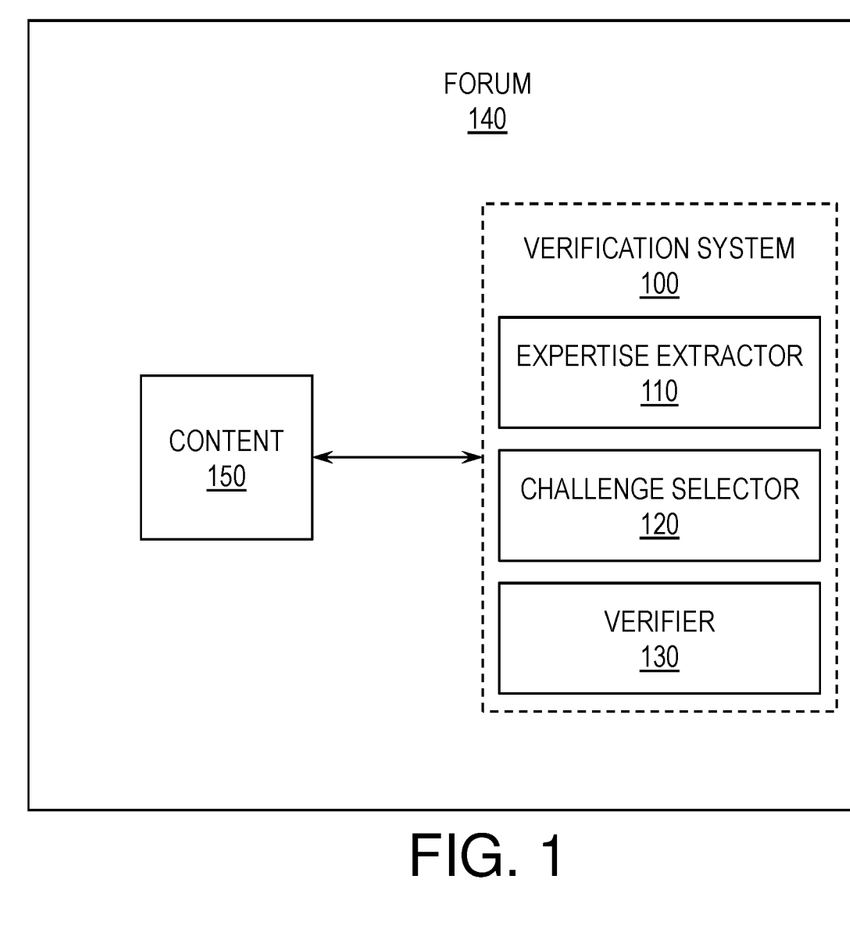
FIG. 1 is a block diagram of a verification system according to some embodiments of this invention.

FIG. 1 is a block diagram of a verification system 100 according to some embodiments of this invention. As shown, the verification system may include an expertise extractor 110, a challenge selector 120, and a verifier 130, each of which may include hardware, software, or a combination of hardware and software. Generally, the expertise extractor 110 may determine an expertise to be verified, the challenge selector 120 may select challenge data and corresponding expected response data appropriate for verifying the expertise, and the verifier 130 may attempt to verify the expertise based at least in part on comparing the expected response data to response data provided by the poster in reply to the challenge data. Although these components are illustrated in FIG. 1 as being separate components, it will be understood the expertise extractor 110, the challenge selector 120, and the verifier 130 may share common parts or may be further divided.

As shown in FIG. 1, in some embodiments, the verification system 100 is integrated with a forum 140, which may be an online site where users are able to behave as posters by posting content 150. For example, and not by way of limitation, the forum 140 may be a discussion forum, a social media website, review system, bulletin board, newsgroup, or comment section. For instance, a review system may be associated with a product page for selling a product on a website, such that users may use the review system to post content, such as reviews of the product or comments on reviews by others. When a poster initiates submission of content 150 to the forum 140, the verification system 100 may then pose a challenge to the poster responsive to the initiation. That initiation may include, for example, opening a content section of the forum 140, mouse-clicking on a text box in the forum 140, typing content 150 in the forum 140, or pressing a submit button after having typed content 150 in the forum 140.

In some embodiments, the verification system 100 is integrated into a posting application of the forum 140, such as by way of scripting on the client-side or by way of a server-side application. As such, the initiation of the content submission may be captured and handled by the verification system 100. If a poster whose initiation has been captured is approved by the verification system 100 for posting content 150, as will be described further below, then the poster's content 150 may be posted for others to see. In some embodiments, that content 150 is also tagged with the poster's verified expertise, so that other users may know to associate that expertise with the content 150.

Figure 2:
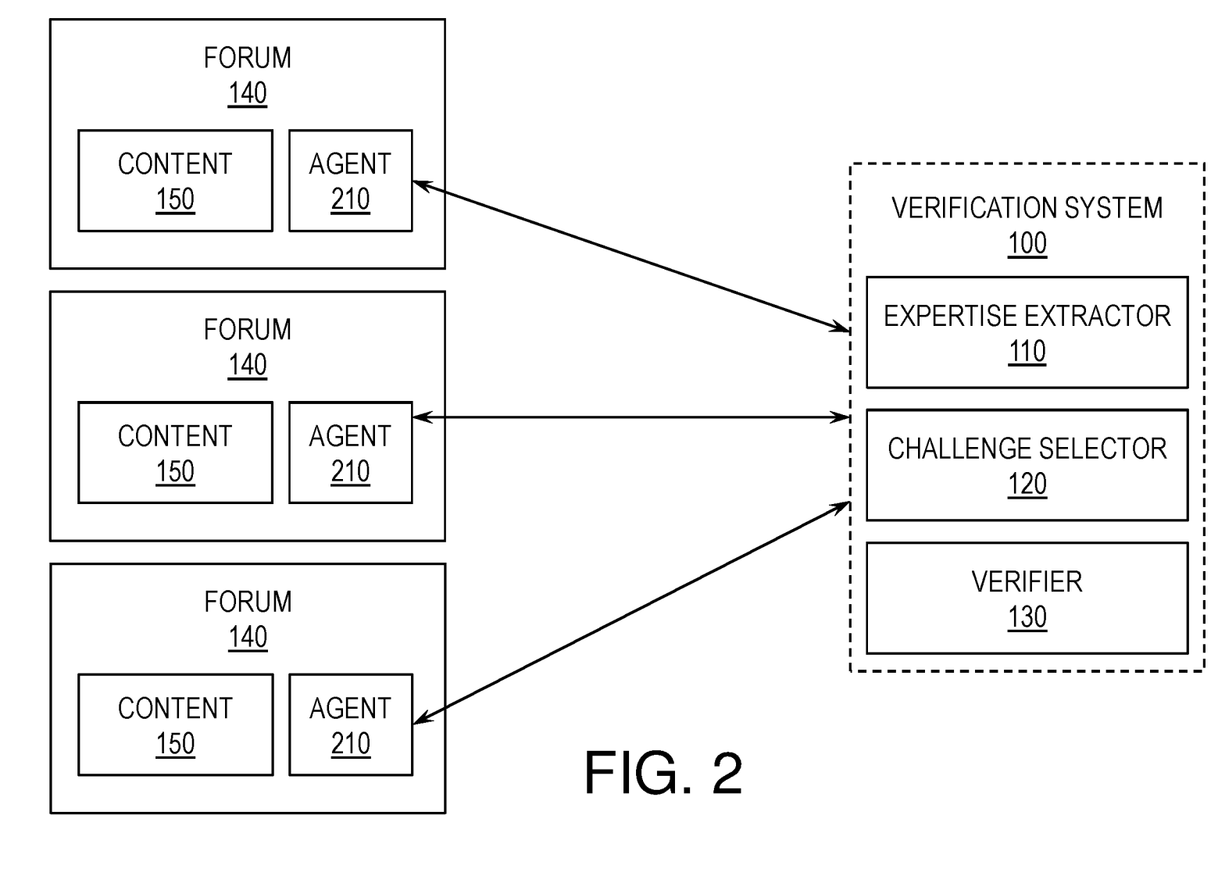
FIG. 2 is another block diagram of the verification system according to some embodiments of this invention.

FIG. 2 is another block diagram of the verification system 100 according to some embodiments of this invention. As shown in FIG. 2, in some embodiments, the verification system 100 is distinct from the forum 140 rather than integrated with it. In this case, an agent 210 of the verification system 100 may be installed at the forum 140 to enable the verification system 100 to communicate with users, such as posters or those reading posted content, as if integrated with the forum 140. In some embodiments, the agent 210 may be software, such as an application, that passes data between a corresponding forum 140 and other aspects of the verification system 100. The verification system 100 may be in communication with one or more distinct forums 140, such as by way of the agents 210 associated with the forums 140. Each forum 140 may be associated with a distinct website and managed by a distinct entity as compared to the other forums 140, and the verification system 100 may behave as a trans-vendor system, which performs third-party verification of a poster's content 150 on the various forums 140. When the poster initiates content submission at a forum 140, the forum 140 may either transfer the poster to a web page of the verification system 100, which may transfer the poster back to the forum 140 after verification is attempted, or the forum 140 may communicate with the verification system 100 to receive challenge data and verification results.

Figure 3:
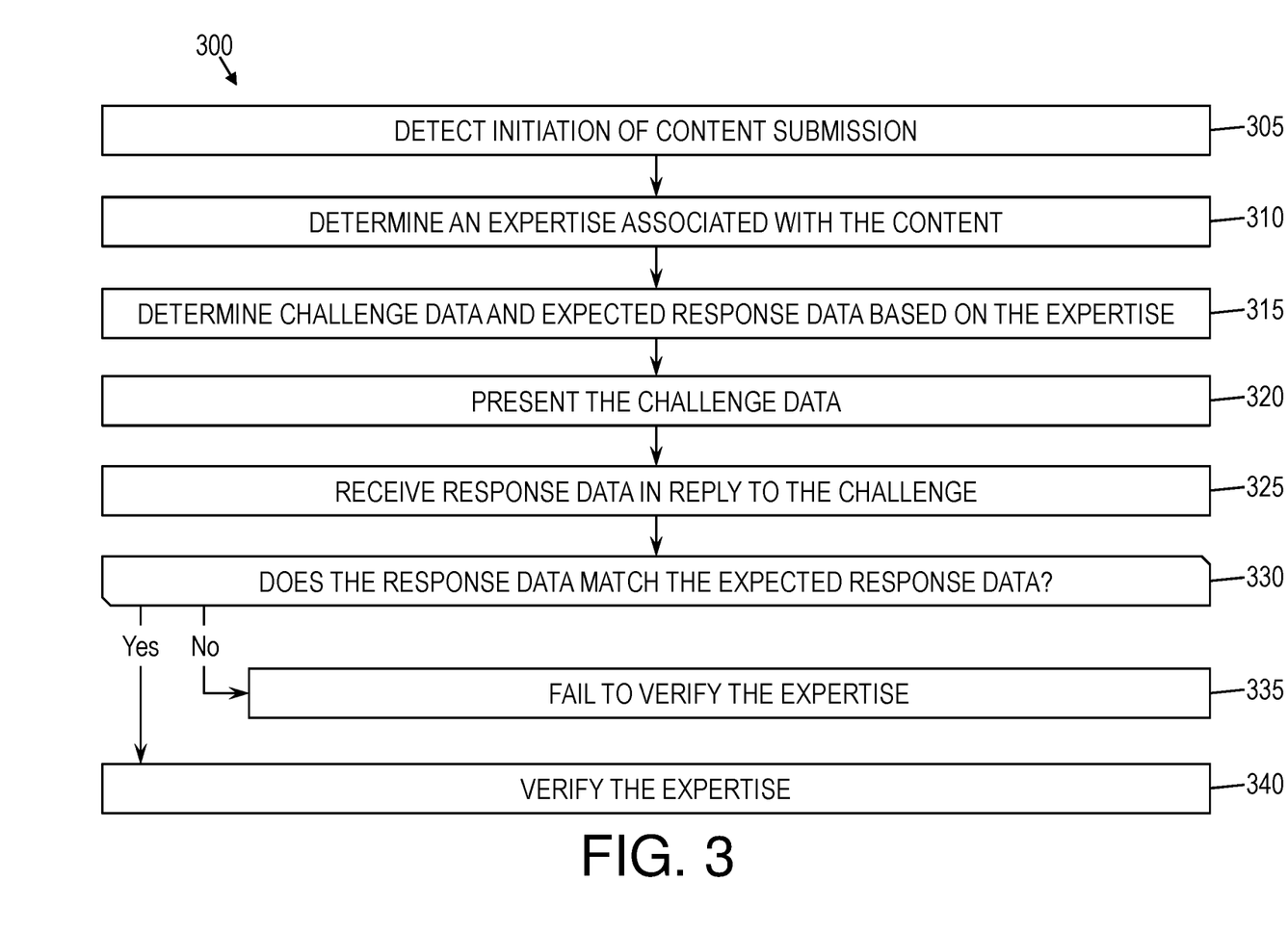
FIG. 3 is a flow diagram of a method for verifying a poster's expertise according to some embodiments of this invention.

FIG. 3 is a flow diagram of a method 300 for verifying expertise, according to some embodiments of this invention. As shown in FIG. 3, at block 305, the verification system 100 may detect that a poster has initiated content submission on a forum 140. Although the poster may be a human being, this need not be the case. A bot, such as an artificially intelligent user, may initiate content submission in same cases. In such cases, the verification system 100 may verify the bot's expertise in the same manner in which it would verify the expertise of a human poster, as described in more detail below. This detection of content submission initiation may occur in various ways. For example, in some embodiments, the verification system 100 is integrated into a web browser of the poster and may thus capture the poster's interaction with that web browser when the poster submits content 150, such as a comment or a new post, to the forum 140. In another example, the forum 140 may notify the verification system 100 that content submission has been initiated, and the forum 140 may provide the verification system 100 with access to the poster's content 150 if that content 150 has already been provided. In another example, initiation of content submission may take the form of an attempt to access the forum 140, in which the posting of content 150 is generally allowed, and in that case, the verification system 100 may detect or be notified of the poster's attempt to access the forum 140.

At block 310, the verification system 100 may determine an expertise associated with the poster of the content 150, which may be an expertise claimed in the content 150 itself. This determination may be performed by various mechanisms. In some embodiments, the poster has already provided the content 150 on the forum 140, and the verification system 100 may have access to the text or other data of that content 150. For example, and not by way of limitation, the poster may initiate content submission by typing the content 150 and pressing a submit button on the forum 140. The forum 140 or verification system 100 may thus capture the content 150 from the web browser. If it is the forum 140 and not the verification system 100 that captured the content 150, then the forum 140 may transmit the content 150 to the verification system 100. Based at least in part on the text or other data of the content 150, the verification system 100 may determine the expertise to be verified, which may be an expertise claimed by the poster in the content 150. Additionally or alternatively, in some embodiments, the poster is enabled to explicitly provide an expertise to the forum 140, and the verification system 100 may use that provided expertise.

According to some embodiments, an expertise includes a field and, optionally, a level. For example, the field may be an area of work, study, or practice, such as plumbing or radiology. In some cases, the field may be narrow and specific to a product, such as a product that is a topic of the poster's content 150. For instance, if the content 150 is a review of a book, then the field may be that book. The level of expertise may indicate how skilled or knowledgeable one is in the field, or the level may indicate the verification system's confidence in the poster's knowledge of the field. In some embodiments, a field is associated with a set of available levels, and an expertise may include the field as well as one of the available levels associated with that field. For example, and not by way of limitation, the set of available levels for the field of plumbing may include the following: home owner, newbie, amateur, novice, expert. In some embodiments, each available level for a field is indicated by a corresponding numeral used as a ranking, but it will be understood that this need not be the case.

In some embodiments, the verification system 100 utilizes machine learning, such as natural language processing, to determine the expertise to be verified based at least in part on the content 150 provided by the poster. In many cases, the poster may explicitly claim an expertise, including a field and sometimes also a level, and the verification system 100 may detect that claim of expertise for later verification. For instance, in seeking for his content 150 to be believed, the poster may state his profession or other indication of expertise. The verification system 100 may thus extract this information from the content 150 or from previous content provided by the poster. In the case where the content 150 relates to a product, the product itself may be selected as the field of the expertise by default. In some embodiments, the forum 140 provides a means for the poster to explicitly select an expertise, such as by way of radio buttons or a drop-down box, and in such cases, the verification system 100 may utilize the poster's selection as an indication of the expertise to be verified.

At block 315, based at least in part on the expertise, the verification system 100 may determine challenge data, to be presented to the poster as a challenge, and corresponding expected response data, which is an expected response to the challenge. The challenge may be a question, statement, image, or video that prompts a response from the poster, and the expected response may be a value known to be a correct answer or other form of correct response to the challenge. For example, if a poster has initiated the posting of content 150 responding to a previous post about a burst water pipe, the verification system 100 may attempt to verify that the poster has sufficient expertise in the field of plumbing. The challenge may then be an illustration of type of water pipe connection along with a question asking the poster to name the connection. For another example, if the expertise is in the field of radiology, the challenge may include a Magnetic Resonance Imaging (MRI) image and a question asking the poster to identify what is shown in the image. For another example, if the content 150 relates to a novel, the challenge may question the poster about the content of the novel. In some embodiments, the challenge is presented to the poster by way of two-dimensional or three-dimensional virtual reality, and in that case, the challenge may ask the poster to interact with virtual surroundings in his response.

In some embodiments, the challenge and expected response are determined by machine learning, such as by performing natural language processing on one or more data sources. For example, the data sources may be web pages, textbooks, manuals, or instruction guides. The data sources used may be dependent on the expertise. For example, and not by way of limitation, if the expertise field is mathematics and the expertise level is expert, then the verification system 100 may use one or more advanced mathematics textbooks when determining the challenge and expected response. In some embodiments, the verification system 100 maintains a list of available expertises, where each expertise may be associated with a set of data sources. Thus, when the expertise is determined, then the verification system 100 may select one or more data sources from among those associated with the expertise.

For example, and not by way of limitation, the verification system 100 may determine a challenge and expected response by way of inverting a statement within a data source to turn the statement into a question, or by removing one or more words and asking the poster to fill in the missing words. For instance, if a mathematics textbook includes a statement that has a complex formula and a correct solution to that formula, the verification system 100 may present the formula to the poster and ask for a solution, where the correct solution provided in the textbook is the expected response. For another example, an instructional guide for plumbing may illustrate and name a tool in question, and may also include illustrations of other tools. The challenge may thus include the illustration of the tool as well as illustrations of two other tools, and may ask which of the three tools is the one in question.

In some embodiments, the challenge and expected response are dynamically generated when verification is needed due to content submission being initiated. However, in some embodiments, the verification system 100 stores pairs of challenges and expected responses, each pair associated with a particular expertise, which may include a field and a level, and thus determining a challenge and expected response may include selecting a challenge and expected response from those associated with the expertise. Further, in some embodiments, the verification system 100 is able to generate challenges and expected responses on demand, and these are stored in association with the expertise for later use. Thus, at a later time, a previously generated challenge and corresponding expected response may be selected when a later verification of the associated expertise is desired.

At block 320, the verification system 100 may present the challenge to the poster, such as by displaying the challenge. In some embodiments, this may be performed by the verification system 100 causing the challenge to be displayed on the forum 140.

At block 325, the verification system 100 may receive response data from the poster, where the response data is the poster's reply to the challenge. For example, and not by way of limitation, the poster may type or select his response on the forum 140, and the verification system 100 may capture that response or receive the response from the forum 140. In some embodiments, the verification system 100 sets a time limit on how long the poster has to respond to the challenge. In that case, if the poster has failed to submit a response within the time limit, the verification system 100 may treat the poster's response as empty or blank, and the expertise will thus not be verified. In some embodiments, the verification system 100 may detect when the poster switches to a different browser window than the one on which the challenge was presented, which might indicate that the poster is researching an answer to the question. For example, and not by way of limitation, when the verification system 100 is integrated with the poster's web browser, scripting may be used to detect inputs that indicate the poster's switch to a new browser window. In this case, the verification system 100 may treat the poster's response as empty or blank, and the expertise may thus not be verified.

At decision block 330, the verification system 100 may determine whether the response data and the expected response data match. In some embodiments, the two may be deemed a match even if not precisely the same. For example, and not by way of limitation, natural language processing may be performed on the response data to determine whether its content has the same meaning as the expected response data. For another example, fuzzy matching may be used to compare the response data to the expected response data.

If the response data does not match the expected response data, then at block 335, the verification system 100 may fail to verify the poster's expertise. Due to the failure, the verification system 100 may reject the poster's content 150 entirely, or the verification system 100 may tag the poster's content 150 on the forum 140 with a notification that the poster's expertise is unverified. More generally, if a confidence level is somewhat low regarding the poster's having a particular expertise, or if the level of a poster's expertise is deemed sufficiently low, the verification system 100 may signal that there exists uncertainty about the poster's expertise, in which case particular content 150 of the poster may be viewed with caution by other users. The verification system 100 need not entirely deny posting to the forum 140 as a result of failure to verify or to sufficiently verify an expertise.

However, if the response data matches the expected response data, then at block 340, the verification system 100 may verify the expertise for the poster. Due to the verification, the poster's content 150 may be allowed to be posted on the forum 140, and in some embodiments, the content 150 is tagged with a notification of the verified expertise. This notification may include the field and an indication of the level of the expertise, or the notification may include the field without a level. In some embodiments, in which the poster's request for admittance to the forum 140 led to the verification, the verification may cause the poster to be allowed access to the forum 140.

Further, in some embodiments, the expertise verification may be used by the forum 140 or elsewhere for targeting advertisements. After an expertise has been verified for a user, the forum 140 may select ads deemed likely to appeal to someone having that expertise, which may include consideration of both a field and a level of the expertise. For example, if a user has been verified as an expert computer scientist, the forum 140 may then target that user with ads for consumer electronics.

In some embodiments, a poster initiating content submission is assigned some level of expertise in the field. Further, in some embodiments, the verification system 100 may automatically tag the poster's content 150 on the forum 140 with the poster's assigned expertise. The level of the expertise may be based at least in part on whether the response matches the expected response, but need not be entirely based on this matching. In some embodiments, the poster's level of expertise related to a particular field may be based at least in part on one or more of the following, or may be adjusted based at least in part on one or more of the following: the poster's location, social proximity to other users who have been assigned expertises, number of challenges answered correctly in the past, ratings submitted by other users relating to the poster's content 150, and social eminence (e.g., participation in blogs, wikis, articles, and patents).

Regarding social proximity to other users who have been assigned expertises, the verification system 100 may perform a social network analysis, which may be based at least in part on one or more networks to which the verification system 100 or the forum 140 has access. For example, and not by way of limitation, if the forum 140 is part of a social networking website, then the verification system 100 may have access to the poster's connections on that social networking website. The social network analysis may consider one or more of the following related to a social network of the poster: degree centrality, closeness centrality, betweenness centrality, eigenvector centrality, Katz Centrality and PageRank, percolation centrality, cross-clique centrality, and Freeman Centralization. In some embodiments, hubs or authorities are also considered. These factors may be relevant to expertise because experts tend to cluster together in networks, and thus connections to experts can be indications of a level or field of expertise.

In some embodiments, the poster may be identifiable by the verification system 100, such as by having an account with the verification system 100, having cookies stored by the poster's browser from the verification system 100, or using a device recognized by the verification system 100 as having been used previously and being associated with prior expertise verification. When the verification system 100 has identified the poster, his history of interactions with the verification system 100 may be considered when determining which challenge to present and when determining the level of expertise to assign to the poster. For example, and not by way of limitation, if the poster was previously verified for a first level of the expertise, the challenge may be selected based at least in part on a second level that is higher than the first level so as to determine whether the poster's expertise level should be increased. Thus, at each challenge, the poster may be presented with questions having increasing difficulty, as the verification system 100 attempts to determine the poster's precise level of expertise. In some embodiments, however, after the poster has answered a previous challenge correctly (i.e., his response matched the expected response), where that previous challenge was related to the same expertise field at a level the same as or higher than the level of the expertise being verified, the verification system 100 may automatically verify the poster for the content 150 being submitted, without requiring that another challenge be presented. However, expertise verification need not last for an indefinite period, as a poster may fall out of practice in a field or knowledge in the field may evolve. As such, the verification system 100 may occasionally present a challenge to a poster who has been previously verified for an applicable expertise. The time for which a verification lasts may be field-dependent. For instance, a swiftly changing field may require more frequent expertise verification than a field that is largely stagnant.

In some embodiments, instead of or in addition to presenting the type of challenge described above, the verification system 100 may use data mining to determine whether the poster has the expertise being verified. In that case, the challenge may inherently be a question as to whether certain data can be found related to the poster. For instance, when the poster has initiated submission of content 150 on a product page, where that content 150 may be for example a review of the product, the verification system 100 may use data mining to determine whether the poster has purchased the product. In this case, the verification system 100 may search the poster's purchase history associated with the forum 140, or may search other data sources to which the poster provides access. The poster's expertise related to that product may be automatically verified if a purchase of the product is identified through data mining. In some embodiments, the verification system 100 may verify the expertise if purchase of the product is deemed likely. For example, the verification system 100 may have access to the poster's residential address, which may be obtained from the forum 140 for example, and the verification system 100 may thus determine whether the poster lives in an urban, suburban, or rural area. The verification system 100 may consider it more likely that a poster living in a rural area would purchase a chainsaw as compared to a poster living in an urban area. Thus, the verification system 100 may verify the poster's expertise related to a specific chainsaw if the poster lives in a rural area, rather than an urban one. However, in the absence of identifying a record of purchase or some other sign of ownership, the verification system 100 may assign a low level to the expertise verified.

Some embodiments of the verification system 100 may be used to verify a poster's age, where that age is treated as an expertise. In such embodiments, for example, the challenge may be designed to be most likely answered correctly by those in a desirable age group. For example, and not by way of limitation, to verify that a poster is over a certain age, the verification system 100 may pose a challenge related to a pop culture event or other historical event that occurred far enough in the past that someone under that certain age would be unlikely to know it. In some embodiments, the challenge includes multiple questions, so as to provide a more accurate determination of age or other expertise being verified.

Figure 4:
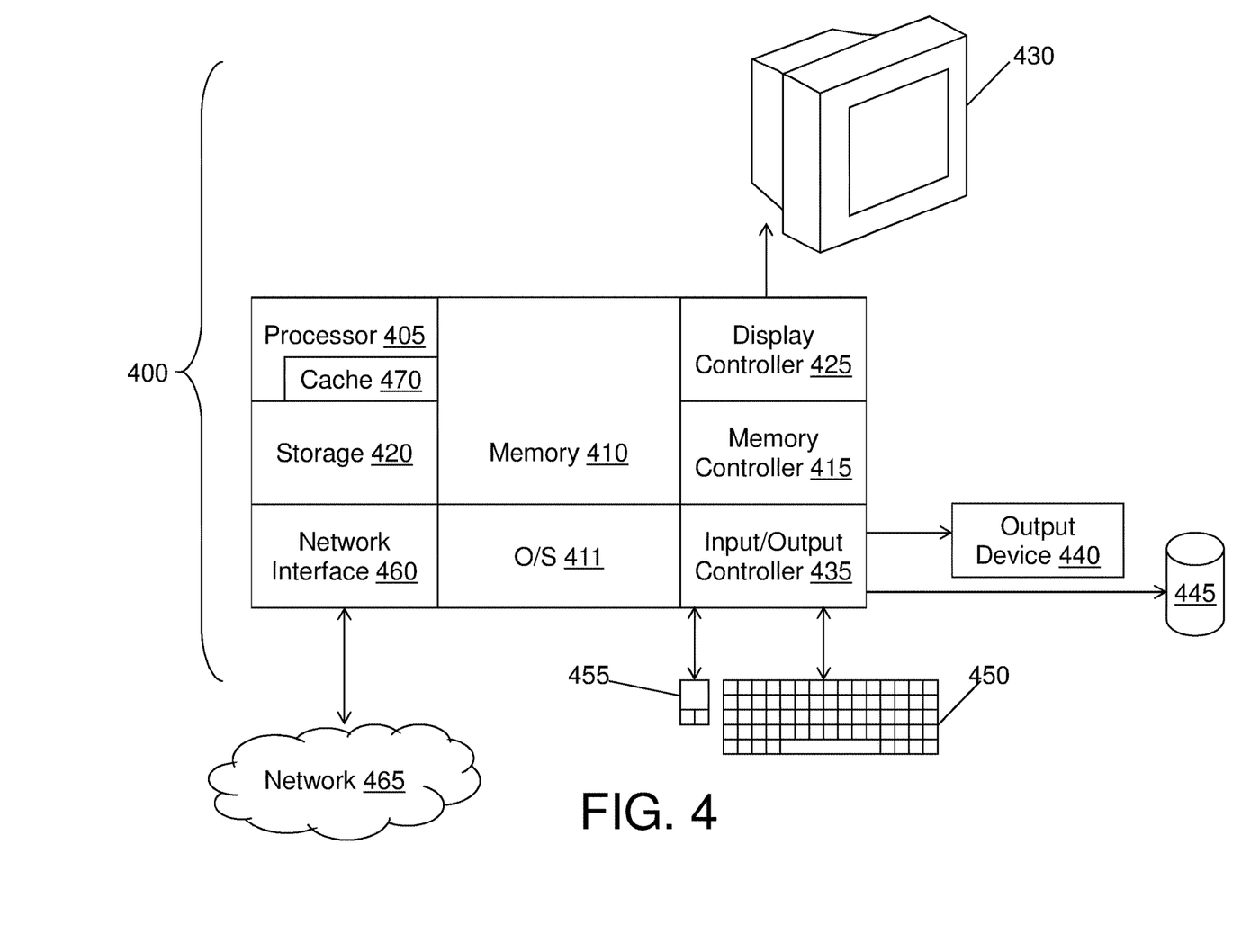
FIG. 4 is a block diagram of a computer system for implementing some or all aspects of the verification system, according to some embodiments of this invention.

FIG. 4 illustrates a block diagram of a computer system 400 for use in implementing a verification system 100 or method according to some embodiments. The verification systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the verification systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Verification systems 100 and methods according to this disclosure may be embodied, in whole or in part, in computer program products or in computer systems 400, such as that illustrated in FIG. 4.

Technical effects and benefits of some embodiments include the ability to verify a poster's expertise using natural language processing to extract a claim of expertise and to generate a challenge and expected response. In some embodiments, this generation of challenges and expected responses is performed on demand. When the challenge is presented to the poster, a comparison of the poster's response to the expected response may be used to determine whether the expertise should be verified for the poster. Content 150 of the poster may then be tagged with the poster's expertise status, whether verified or not, to enable others to appropriately evaluate the poster's content 150.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting initiation of submission of content on a forum;
    determining, using a computer processor, an expertise associated with the content;
    determining, using the computer processor, challenge data based at least in part on the expertise;
    determining, using the computer processor, expected response data corresponding to the challenge data, wherein determining the challenge data based at least in part on the expertise and determining the expected response data corresponding to the challenge data comprise, based at least in part on the content, performing natural language processing on a data source related to the expertise to extract the challenge data and the expected response data;
    presenting the challenge data;
    receiving entered response data in reply to the challenge data; and
    allowing the content to be posted on the forum based at least in part on comparing the entered response data to the expected response data.

2. The computer-implemented method of claim 1, wherein determining the expertise comprises performing natural language processing on the content.

3. The computer-implemented method of claim 1, further comprising identifying a poster who initiated the submission of the content on the forum, wherein the challenge data is further based at least in part on a history of challenges presented to the poster.

4. The computer-implemented method of claim 1, further comprising:
    detecting initiation of submission of second content on the forum;
    determining a second expertise associated with the second content;
    determining second challenge data based at least in part on the second expertise;
    determining second expected response data corresponding to the second challenge data;
    presenting the second challenge data;
    detecting that a focus of a web browser has changed from a browser window in which the second challenge data is displayed; and
    rejecting the second content from being posted on the forum, based at least in part on the focus of the web browser having changed from the browser window in which the second challenge data is displayed.

5. The computer-implemented method of claim 1, further comprising tagging the content with a level of the expertise.

6. The computer-implemented method of claim 5, further comprising adjusting the expertise based at least in part on a social network analysis of the poster who initiated the submission of the content on the forum.

7. A system comprising:
    a memory having computer-readable instructions; and
    one or more processors for executing the computer-readable instructions, the computer-readable instructions comprising:
        detecting initiation of submission of content on a forum;
        determining an expertise associated with the content;
        determining challenge data based at least in part on the expertise;
        determining expected response data corresponding to the challenge data, wherein determining the challenge data based at least in part on the expertise and determining the expected response data corresponding to the challenge data comprise, based at least in part on the content, performing natural language processing on a data source related to the expertise to extract the challenge data and the expected response data;
        presenting the challenge data;
        receiving entered response data in reply to the challenge data; and
        allowing the content to be posted on the forum based at least in part on comparing the entered response data to the expected response data.

8. The system of claim 7, wherein determining the expertise comprises performing natural language processing on the content.

9. The system of claim 7, the computer-readable instructions further comprising identifying a poster who initiated the submission of the content on the forum, wherein the challenge data is further based at least in part on a history of challenges presented to the poster.

10. The system of claim 7, the computer-readable instructions further comprising:
    detecting initiation of submission of second content on the forum;
    determining a second expertise associated with the second content;

determining second challenge data based at least in part on the second expertise;
determining second expected response data corresponding to the second challenge data;
presenting the second challenge data;
detecting that a focus of a web browser has changed from a browser window in which the second challenge data is displayed; and
rejecting the second content from being posted on the forum, based at least in part on the focus of the web browser having changed from the browser window in which the second challenge data is displayed.

11. The system of claim 7, the computer-readable instructions further comprising:
tagging the content with a level of the expertise; and
adjusting the expertise based at least in part on a social network analysis of the poster who initiated the submission of the content on the forum.

12. A computer-program product for verifying an expertise, the computer-program product comprising a computer-readable storage medium having program instructions embodied therewith, the program instructions executable by a processor to cause the processor to perform a method comprising:
detecting initiation of submission of content on a forum;
determining an expertise associated with the content;
determining challenge data based at least in part on the expertise;
determining expected response data corresponding to the challenge data, wherein determining the challenge data based at least in part on the expertise and determining the expected response data corresponding to the challenge data comprise, based at least in part on the content, performing natural language processing on a data source related to the expertise to extract the challenge data and the expected response data;
presenting the challenge data;
receiving entered response data in reply to the challenge data; and
allowing the content to be posted on the forum based at least in part on comparing the entered response data to the expected response data.

13. The computer-program product of claim 12, wherein determining the expertise comprises performing natural language processing on the content.

14. The computer-program product of claim 12, the method further comprising identifying a poster who initiated the submission of the content on the forum, wherein the challenge is further based at least in part on a history of challenges presented to the poster.

15. The computer-program product of claim 12, the method further comprising:
detecting initiation of submission of second content on the forum;
determining a second expertise associated with the second content;
determining second challenge data based at least in part on the second expertise;
determining second expected response data corresponding to the second challenge data;
presenting the second challenge data;
detecting that a focus of a web browser has changed from a browser window in which the second challenge data is displayed; and
rejecting the second content from being posted on the forum, based at least in part on the focus of the web browser having changed from the browser window in which the second challenge data is displayed.

16. The computer-program product of claim 12, the method further comprising tagging the content with a level of the expertise.

17. The computer-program product of claim 16, the method further comprising adjusting the expertise based at least in part on a social network analysis of the poster who initiated the submission of the content on the forum.

* * * * *